United States Patent
Schirmann et al.

[11] 3,919,256
[45] Nov. 11, 1975

[54] METHOD FOR PREPARING AZINES

[76] Inventors: Jean-Pierre Schirmann, 4, avenue de la Gare, 69 Brignais; Pierre Tellier, 35, Boulevard Emile Zola, 69 Oullins; Henri Mathais, 31, Boulevard Baron du Marais, 69 Sainte Foy Les Lyon; Francis Weiss, 3, Chemin du Perron, 69 Pierre Benite, all of France

[22] Filed: Mar. 13, 1973

[21] Appl. No.: 340,762

[30] Foreign Application Priority Data
Mar. 16, 1972 France .............. 72.09132

[52] U.S. Cl......... 260/345.9; 260/345.1; 260/465 E; 260/465.5 R; 260/566 B
[51] Int. Cl.² .................................. C07C 109/00
[58] Field of Search ......... 260/566 B, 345.1, 345.9, 260/465 E, 465.5 R

[56] References Cited
UNITED STATES PATENTS
2,870,206   1/1959   Meyer et al............... 260/566 B

*Primary Examiner*—Gerald A. Schwartz
*Attorney, Agent, or Firm*—Pennie & Edmonds

[57] ABSTRACT

A method is disclosed for preparing symmetrical azines of the formulas

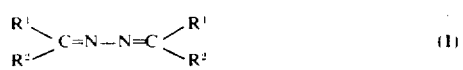
(I)

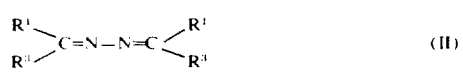

(II)

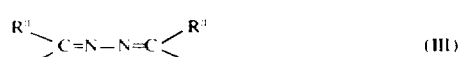

(III)

and unsymmetrical azines of the formulas

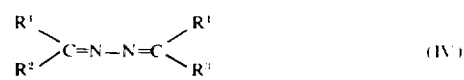
(IV)

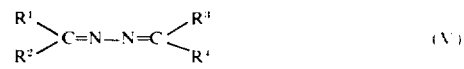

(V)

and mixtures of azines (I), (II) and (IV) and (I), (III) and (V), wherein $R^1$, $R^2$, $R^3$ and $R^4$ each is a hydrogen atom, a straight chain alkyl radical of from 1 to 12 carbon atoms, a branched chain alkyl radical or unsubstituted or alkyl substituted cycloalkyl radical of from 3 to 12 carbon atoms, a hydrocarbon radical of from 6 to 12 carbon atoms containing an aromatic nucleus; further provided that $R^1$ and $R^2$ can be the same or different radicals, and $R^3$ and $R^4$ are the same or different radicals and each are different from $R^1$ and $R^2$; or $R^1$ and $R^2$ and $R^3$ or $R^3$ and $R^4$ bonded to the same carbon atom together form an unsubstituted or aliphatic substituted alkylene radical of from 3 to 11 carbon atoms, each of the aforesaid radicals being unsubstituted or substituted with one or more radicals which are stable in the medium in which the azines are produced.

The method comprises reacting a cyanated compound (VI) with hydrogen peroxide in the presence of a carbonyl compound of the formula

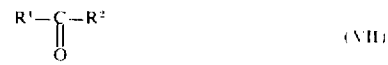
(VII)

alone or together with a different carbonyl compound

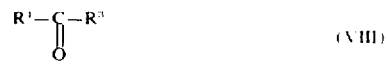
(VIII)

or

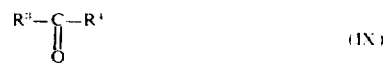
(IX)

wherein $R^1$, $R^2$, $R^3$ and $R^4$ each have the same meaning defined above to provide the azine or mixture of azines.

7 Claims, No Drawings

METHOD FOR PREPARING AZINES

BACKGROUND OF THE INVENTION

I. Field of the invention

This invention relates to a method for preparing symmetrical azines as well as mixtures containing symmetrical and unsymmetrical azines.

II. Description of the Prior Art

Various oxidation reactions of cyanated compounds with hydrogen peroxide have been described in the literature. Thus, for example, cyanides have been oxidized with hydrogen peroxide to form cyanates which in turn were hydrolyzed to form carbonates and ammonia (O. MASSON, J. Chem. Soc. 91, 1449 (1907); E. RUPP and F. PFENNIG, Chem. Ztg. 34, 322 (1910)), and hydrocyanic acid has been oxidized with hydrogen peroxide to provide cyanogen and oxamide (ATTFIELD, J. Chem. Soc. 16, 94 (1863); B. RADZISZEWSKI, Ber. 18, 355 (1885); R. C. SHERIDAN and E. H. BROWN, J. Org. Chem. 30, 668 (1965). The oxidation of thiocyanates with hydrogen peroxide has also been described and leads to the formation of sulfates, cyanates and carbonates ( I. R. WILSON and G. M. HARRIS, J. Am. Chem. Soc. 82, 4515 (1960); 83, 286 (1961).

SUMMARY OF THE INVENTION

It has been surprisingly discovered that symmetrical azines of the formulas

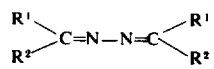 (I)

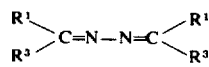 (II)

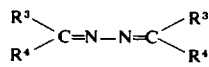 (III)

and unsymmetrical azines of the formulas

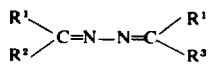 (IV)

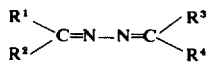 (V)

can be conveniently prepared in good yields by reacting a cyanated compound (VI) with hydrogen peroxide in the presence of a carbonyl compound of the formula

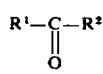 (VII)

alone or together with a different carbonyl compound

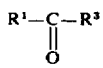 (VIII)

or

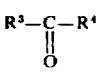 (IX)

wherein R¹, R², R³ and R⁴ each have the same meaning defined above to provide the azine or mixture of azines which may thereafter be recovered from the reaction medium employing known and conventional means.

When a single carbonyl compound (VII) is reacted according to the method of this invention, a symmetrical azine having the formula

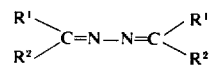 (I)

is produced.

When, for example, both R¹ and R² of carbonyl compound (VII) are hydrogen, the carbonyl compound is formaldehyde and the azine resulting from this method is the symmetrical aldazine, formaldazine, which has the formula

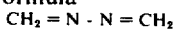

When only one of the substituents is hydrogen, the resulting aldazine, for example, has the formula

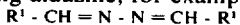

wherein the substituent R¹ is not hydrogen.

When neither of the substituents of the carbonyl compound (VII) is hydrogen, the carbonyl compound (VII) is a ketone and the resulting azine is a symmetrical ketazine of the formula

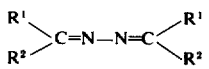 (I)

wherein none of the substituents R¹ and R² is hydrogen.

When in addition to carbonyl compound (VII), a different carbonyl compound (VIII) is simultaneously reacted according to the method of this invention, a mixture of symmetrical and unsymmetrical azines of the formulas

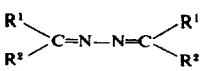 (I)

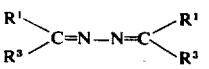 (II)

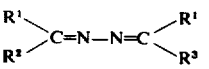 (IV)

is produced.

And if in addition to carbonyl compound (VII), a different carbonyl compound (IX) is simultaneously reacted according to the method of this invention, a mixture of symmetrical and unsymmetrical azines of the formulas

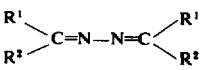 (I)

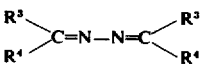 (III)

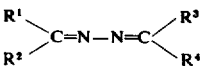 (V)

is produced.

When both carbonyl compounds (VII) and (VIII) are aldehydes, a mixture of symmetrical and unsymmetrical aldazines will be obtained. Similarly, if both carbonyl compounds (VII) and (VIII) or (VII) and (IX) are ketones, a mixture of symmetrical and unsymmetrical ketazines will be produced. And if one of the carbonyl compounds (VII), (VIII) or (IX) is an aldehyde and the other carbonyl compound which is being simultaneously reacted is a ketone, the method of this invention will yield a mixture of azines containing a symmetrical aldazine, a symmetrical ketazine and an unsymmetrical azine possessing the characteristics of both an aldazine and a ketazine.

Any number of different aldehydes and/or ketones may be reacted according to the method of this invention to yield mixtures of azines, the number and amount of which are present in the mixture being made to depend upon the number, amount and nature of the carbonyl compounds reacted.

The oxidation reaction of the present invention results in the oxidation of the nitrogen contained in the cyanated compounds which is at the level of oxidation of ammonia and then goes to the level of oxidation of hydrazine thereby distinguishing it from the previously known oxidation reactions wherein the degree of oxidation of nitrogen does not undergo any change.

The carbonyl compounds of this invention can contain ethylenic bonds and one or more substituents which are stable in the reaction medium such as chlorine, bromine, and fluorine atoms and nitro, hydroxy, alkoxy, carboxylic acid, carboxylic amide or ester and nitrile groups.

Some examples of aldehydes conforming to formulas (VII), (VIII) or (IX) which are advantageously employed in the method of this invention include formaldehyde, acetaldehyde, propionaldehyde, butyraldehyde, isobutyraldehyde, n-pentanal, pivalaldehyde, oenanthal, 2-ethylhexanal, 3-Δtetrahydrobenzaldehyde, hexahydrobenzaldehyde, 5-norbornene-2-carboxaldehyde, tetrahydropyran-2-carboxaldehyde, benzaldehyde, the monochlorobenzaldehydes, p-nitrobenzaldehyde, anisaldehyde, β-chloropropionaldehyde, β-methoxypropionaldehyde and 4-cyano,2,2-dimethylbutyraldehyde.

Some examples of ketones conforming to formula (VII), (VIII) or (IX) which are advantageously employed in the method of this invention include acetone, 2-butanone, 2-pentanone, 3-pentanone, methylisopropylketone, methylisobutylketone, ethylamylketone, methylcyclohexylketone, acetophenone, benzophenone, cyclobutanone, cyclopentanone, cyclohexanone, 2-methylcyclohexanone, 3-methylcyclohexanone, 4-methylcyclohexanone, 2,4-dimethylcyclohexanone, 3,3,5-trimethylcyclohexanone, isophorone, cycloheptanone, cyclooctanone, cyclodecanone and cyclododecanone.

The cyanated compounds (VI) which can be advantageously employed in the method of this invention include the simple or complex salts of hydrocyanic, cyanic or thiocyanic acid, the halides, amides and esters of cyanic acid and the oligomers, especially the dimers and trimers, of the aforesaid derivatives of cyanic acid.

Advantageously, the salts of hydrocyanic, cyanic or thiocyanic acid are selected from amongst the ammonium, alkali or alkaline earth metal, magnesium of zinc salts but the complex salts such as potassium ferrocyanide can also be used. As the halides of cyanic acid, it is advantageous to use cyanogen chloride or bromide, the amide of cyanic acid, i.e., $H_2N$—CN, used either as such or in the form of its alkali or alkaline earth metal salts and the esters of cyanic acid advantageously selected from amongst the lower alkyl esters wherein the alkyl group contains from 1 to 6 carbon atoms or the phenyl esters. The oligomers of the cyanic acid derivatives which can be used herein are advantageously selected from amongst the known dimers and trimers, which is to say, dicyandiamide, the salts and esters of cyanuric or isocyanuric acid, the cyanuric halides and melamine to name a few.

The hydrocyanic, cyanic, thiocyanic, cyanuric or isocyanuric acid salts can be used as such but can also be prepared in the reaction medium in situ from the acids themselves and an appropriate base such as ammonia, sodium or potassium hydroxide, calcium oxide (lime), barium oxide, sodium carbonate and so forth. In the case of the cyanides, it is possible in place of preparing the salts in situ from free hydrocyanic acid, to use the latter in the combined state in the form of a cyanohydrin of a carbonyl compound

(X)

alone or together with a different cyanohydrin

(XI)

or

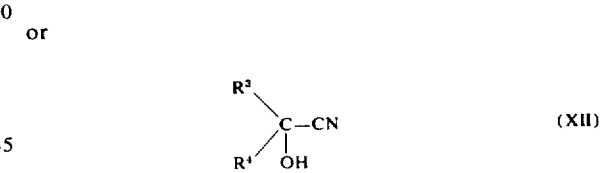

(XII)

wherein $R^1$, $R^2$, $R^3$ and $R^4$ each have the same meaning defined above. These cyanohydrins decompose in the reaction medium with the addition of a corresponding amount of base, thus providing a convenient source for the carbonyl compound or mixture of carbonyl compounds of the method of this invention.

The reaction components are reacted in solution and mixed one after the other or in various combinations. For example, the reaction components can be separately or simultaneously introduced into the reactor on a continuous or batch-wise basis. The hydrogen peroxide can be added to a solution of cyanated compound and carbonyl compound or the cyanated compound can be added to a solution of the hydrogen peroxide and the carbonyl compound. It is advantageous to employ a solvent or blend of solvents to maintain a homogenous reaction medium or produce at least a partial solubilization of the reactants. Examples of solvents which can be used for this purpose include the saturated alcohols having 1 to 6 carbon atoms such as methanol, ethanol, n-propanol, isopropanol, n-butanol, 2-butanol, isobutanol, tertbutanol, the amyl alcohols and cyclohexanol.

The temperature of the reaction can advantageously be from about −20° to 100°C. The reaction can be carried out at or above atmospheric pressure, up to 10 atmospheres if such is necessary to maintain the reaction components in solution.

The reaction components can be advantageously employed at a ratio of from 1 to 10 moles of carbonyl compound or mixture thereof and 0.5 to 10 moles of hydrogen peroxide per mole of cyanate compound or equivalent of cyanated oligomer. By oligomer equivalent is meant the $n^{th}$ part of an oligomer molecule formed by the condensation of n molecules of the corresponding cyanated monomer, e.g., half mole of dimer, a third mole of trimer and so forth. The amount of carbonyl compound or mixture thereof which is employed herein should take into account the amount of cyanohydrin or mixture of cyanohydrins employed, if any.

It can be advantageous to add ammonia to the reaction medium which then contributes to the formation of azine and increases the efficiency of the process. In this variation of the process, in addition to the other reactants previously described, from about 0.1 to 10 moles of ammonia can be introduced into the reaction medium.

The pH of the medium is advantageously maintained between about 7 and 12 and one or more known and conventional substances which exercise a buffering action on the pH of the reaction medium as well as hydrogen peroxide stabilizers can be added thereto. For example, from about 0.1 to 1.0% by weight of the reaction medium of phosphoric acid, pyrophosphoric acid, citric acid, nitrilotriacetic acid, ethylenediaminetetraacetic acid or the alkaline metal or ammonia salts of the aforesaid acids can be used.

Upon completion of the reaction, the azines can be recovered from the medium by means of known and conventional techniques including extraction with a non-miscible solvent, fractional distillation or a combination of these two methods.

The azines of this invention are useful as intermediates in the preparation of many important products and in particular are useful for preparing hydrazine and hydrazine salts by hydrolysis according to known and conventional methods. Hydrolysis of the azines releases the carbonyl compounds which can be recycled for preparing additional quantities of azines according to the method of this invention.

The following examples are illustrative of the method of this invention. Although the examples employ but a single carbonyl compound resulting in symmetrical azines it is understood that the same procedures can be followed except that two or more different aldehydes or ketones or one or more aldehydes and ketones are reacted to result in a mixture of symmetrical and unsymmetrical azines as hereinbefore described.

EXAMPLE 1

49 gm. of sodium cyanide (1 mole), 23,2 gm. of acetone (0.4 moles), 300 gm. of water as well as 2 gm. of the disodium salt of ethylenediaminetetraacetic acid and 0.4 gm. of ammonium acetate were placed in a reactor equipped with mechanical agitation. After the mixture was heated to 50°C., 88 gm. of hydrogen peroxide in a 70% by weight aqueous solution (1.8 moles) and 92.8 gm. of acetone (1.6 moles) were simultaneously added to the reaction medium over a half hour period. After three hours of reaction, 0.06 moles of acetoneazine were present in the reaction medium.

EXAMPLE 2

Substantially the same conditions as Example 1 were repeated except this time, ammonia was bubbled into the reaction medium at the rate of 1 mole/hour. After 4 hours of reaction, 0.08 moles of acetoneazine were present in the reaction medium.

EXAMPLE 3

A solution containing 65 gm. of sodium cyanate (1 mole) 23.2 gm. of acetone (0.4 moles) 2 gm. of the disodium salt of ethylenediaminetetraacetic acid (EDTA) and 0.4 gm. ammonium acetate in 600 gm. of water were heated to 50°C. 39 gm. of hydrogen peroxide in a 70% aqueous solution (0.8 moles) and 92.8 gm. of acetone (1.6 moles) were simultaneously added to the reaction medium over a half hour period. After 1 hour of reaction at 50°C., 0.05 moles of acetoneazine were present in the reaction medium.

EXAMPLE 4

A solution containing 32.5 gm. sodium cyanate (0.5 moles), 11.6 gm. of acetone (0.2 moles), 17 gm. of ammonia (1 mole), 1 gm. of the disodium salt of EDTA, 1 gm. of disodium phosphate and 0.2 gm. of ammonium acetate in 350 gm. of water were prepared. Thereafter, 23.2 gm. of acetone (0.4 moles) and 9.75 gm. of hydrogen peroxide in a 70% by weight aqueous solution (0.2 moles) were simultaneously added to the reaction medium. After 1 hour of reaction at 50°C., 0.124 moles of acetone azine were present in the reaction medium.

EXAMPLE 5

A solution of 38 gm. of ammonium thiocyanate (0.5 moles) in 200 gm. of water were placed in a reactor. 11.6 gm. of acetone, 1 gm. of the disodium salt of EDTA, 0.2 gm. of ammonium acetate and 1 gm. of disodium phosphate were added. 122 gm. of hydrogen peroxide in 70% by weight aqueous solution (2.5 moles) and 46.4 gm. of acetone (0.8 moles) were simultaneously added to the reaction medium over 1 hour. After 5 hours of reaction at 50°C., the reaction medium contained 0.03 moles of acetoneazine.

EXAMPLE 6

A solution of 12.2 gm. of sodium cyanide (0.25 moles) in 155 gm. of water was prepared. To this solution were added 9.8 gm. of cyclohexanone (0.1 moles) in 125 gm. of methanol as well as 0.5 gm. of the disodium salt of EDTA and 0.1 gm. of ammonium acetate. After heating the medium to 50°C., 30.2 gm. of cyclohexanone (0.4 moles) and 22 gm. of hydrogen peroxide in a 70% by weight aqueous solution (0.45 moles) were simultaneously added to the medium over 1 hour while ammonia was bubbled therein at a rate of 1 mole/hour. After 4 hours of reaction, 0.06 moles of cyclohexanoneazine were present in the reaction medium.

EXAMPLE 7

A solution of 6.5 gm. of sodium cyanate (0.1 moles) in 180 gm. of water were placed in a reactor. To this solution were added 3.9 gm. of cyclohexanone (0.04 moles) in 135 gm. of methanol as well as 3.4 gm. of ammonia (0.2 moles), 0.2 gm. of the disodium salt of EDTA and 0.04 gm. of ammonium acetate. After heating the medium to 50°C., 3.9 gm. of hydrogen peroxide in a 70% by weight aqueous solution (0.08 moles) and 15.7 gm. of cyclohexanone (0.16 moles) were simultaneously added to the reaction medium. After four hours of reaction, 0.04 moles of cyclohexanoneazine were present in the reaction medium.

EXAMPLE 8

Substantially the same reaction conditions of Example 6 were repeated except that cyclohexanone was replaced with isobutyraldehyde. After 3 hours of reaction, 0.06 moles of the azine of isobutyraldehyde were present in the reaction medium.

EXAMPLE 9

85 gm. of acetonecyanohydrin (1 mole) 23.2 gm. acetone (0.4 moles), 36 gm. ammonia in a 19% solution as well as 2 gm. of the disodium salt of EDTA and 0.4 gm. of ammonium acetate were placed in a reactor. After heating the medium to 50°C., 39 gm. of hydrogen peroxide in a 70% by weight aqueous solution (0.8 moles) and 92.8 gm. of acetone (1.6 moles) were simultaneously added to the reaction medium over a 30 minutes period. After 5 hours of reaction, 0.466 moles of acetoneazine were present in the reaction medium.

EXAMPLE 10

A solution of 17 gm. acetonecyanohydrin (0.2 moles) in 100 gm. water containing 1 gm. of the disodium salt of EDTA was prepared. The temperature of the reaction medium was raised to 50°C., and a pH of 7.8 resulted from the addition of sodium hydroxide. Thereafter, 19.5 gm. of hydrogen peroxide in a 70% by weight aqueous solution (0.4 moles) were added to the reaction medium over 1 hours. After 2 hours of reaction, 0.003 moles of acetoneazine were present in the reaction medium.

EXAMPLE 11

42 gm. of cyanamide (1 mole), 23.2 gm. of acetone (0.4 moles), 36 gm. of ammonia in a 19% solution, 2 gm, of the disodium salt of EDTA and 0.4 gm. of ammonium acetate were successively added to a reactor. At 50°C., 39 gm. of hydrogen peroxide in a 70% by weight aqueous solution (0.8 moles) and 92.8 gm. of acetone (1.6 moles) were added over a 30 minutes period. After 4 hours of reaction, 0.204 moles of acetoneazine were present in the reaction medium.

EXAMPLE 12

To a solution of 98 gm. of cyclohexanone (1 mole) in 160 gm. methanol (5 moles) were added 21 gm of cyanamide (0.5 moles), 18 gm. water, 1 gm. of the disodium salt of EDTA and 0.15 gm. of ammonium acetate. The medium was saturated with gaseous ammonia at 50°C. 19.5 gm. of hydrogen peroxide in a 70% by weight aqueous solution (0.4 moles) were then added to the reaction medium over 30 minutes. After 2 hours of reaction there were present in the reaction medium 0.05 moles of cyclohexanoneazine.

EXAMPLE 13

To a solution of 39.2 gm. of cyclohexanone (0.4 moles) in 160 gm. of methanol (5 moles) were added 16.8 gm. of dicyandiamide (0.2 moles), 18 gm. of water, 1 gm. of the disodium salt of EDTA and 0.15 gm. of ammonium acetate. At 50°C., 7.8 gm. of hydrogen peroxide in a 70% by weight aqueous solution (0.16 moles) were added to the medium. After 3 hours of reaction, 0.004 moles of cyclohexanoneazine were present in the reaction medium.

EXAMPLE 14

42.2 gm. of potassium ferrocyanide (0.1 moles), 1 gm. of the disodium salt of EDTA and 0.2 gm. of ammonium acetate were successively dissolved in 170 gm. of water. Thereafter 50 cm$^3$ of a decinormal solution of sodium monophosphate as well as 24 gm. of ammonia in a 14% solution and 11.6 gm. of acetone (0.2 moles) were added. At 50°C., 3.9 gm. of 70% hydrogen peroxide (0.08 moles) diluted in 27 gm. of water were added to the reaction medium. After 4 hours of reaction, 0.007 moles of acetoneazine were present in the reaction medium.

EXAMPLE 15

14.5 gm. of acetone (0.25 moles), 65 gm. of methanol, 0.25 gm. of the disodium salt of ethylenediaminetetraacetic acid and 5 gm. of a 68% by weight aqueous solution of hydrogen peroxide (0.1 moles) were placed in a reactor and thereafter 8.5 gm. of ammonia (0.5 moles) were added to the solution. The solution was cooled to 0°C. and then 5.5 gm. of cyanuric chloride (0.03 moles) was added thereto over a period of 15 minutes. After 6 hours of reaction at this temperature, the reaction medium contained 3.1 gm. of acetoneazine (0.0274 moles).

EXAMPLE 16

Example 15 was substantially repeated except that a greater quantity of cyanuric chloride, namely, 18.5 gm. (0.1 moles) was employed. The introduction of the cyanuric chloride was carried out over 2 hours at 0°C. and the reaction was left to proceed for another 30 minutes at this temperature. The final solution then contained 6.2 gm. of acetoneazine (0.055 moles).

We claim:

1. A method for the preparation of azines of the formula

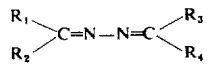

which comprises reacting one or more cyanated compounds selected from the salts of hydrocyanic acid, cyanic acid and thiocyanic acid, halides and lower alkyl esters of cyanic acid, and the dimers and trimers of cyanic acid; with hydrogen peroxide and carbonyl compounds of the formula

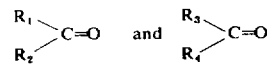

wherein said carbonyl compounds are selected from formaldehyde, acetaldehyde, propionaldehyde, butyraldehyde, isobutyraldehyde, n-pentanal, pivaladehyde, oenanthal, 2-ehtylhexanal, 3-Δtetrahydrobenzaldehyde, hexahydrobenzaldehyde, 5-norbornene-2-carboxyladehyde, tetrahydropyran-2-carboxyaldehyde, benzaldehyde, the monochlorobenzaldehydes, p-nitrobenzaldehyde, anisaldehyde, β-chloropropionaldehyde, β-methoxyproprionaldehyde,4-cyano-2,2-dimethylbutraldehyde, acetone, 2-butanone, 2- pentanone, 3-pentanone, methylisopropylketone, methylisobutylketone, ethylamylketone, methylcyclohexylketone, acetophenone, benzophenone, cyclobutanone, cyclopentanone, cyclohexanone, 2-methylcyclohexanone, 3-methylcyclohexanone, 4-methylcyclohexanone, 2,4-dimethylcyclohexanone, 3,3,5-trimethylcyclohexanone, isophorone, cycloheptanone, cyclooctanone, cyclodecanone or cyclododecanone.

2. The method of claim 1 wherein the halides of cyanic acid include the halides of cyanuric acid.

3. The method of claim 1 wherein the salts of hydrocyanic acid, cyanic acid, and thiocyanic acid include the ammonium salts, alkali metal salts, alkaline earth metal salts, magnesium salts, and zinc salts.

4. The method of claim 1 wherein ammonia is added to the reaction medium.

5. The method of claim 1 wherein the reaction temperature is maintained within the range from about $-20°C$ to $100°C$.

6. The method of claim 1 wherein the pH of the reaction medium is maintained within the range from about 7 to 12.

7. The method of claim 1 wherein the molar ratios of the carbonyl compounds, hydrogen peroxide and ammonia to the cyanate or cyanite compounds or to an equivalent of the dimers and trimers of cyanic acid are respectively between 1 to 10, 0.5 and 10 and 0.1 and 10.

* * * * *

UNITED STATES PATENT AND TRADEMARK OFFICE
CERTIFICATE OF CORRECTION

PATENT NO. : 3,919,256
DATED : November 11, 1975
INVENTOR(S) : Jean-Pierre Schirmann et al.

It is certified that error appears in the above–identified patent and that said Letters Patent are hereby corrected as shown below:

Page 1, second column, line 13, should read -- $R^2$; or $R^1$ and $R^2$ or $R^1$ and $R^3$ or $R^3$ and $R^4$ bonded to the --.

Column 5, line 62, delete "23,2" and substitute therefor -- 23.2 --.

Column 8, line 62, delete "2-ehtylhexanal" and substitute therefor -- 2-ethylhexanal --.

Signed and Sealed this second Day of March 1976

[SEAL]

Attest:

RUTH C. MASON
Attesting Officer

C. MARSHALL DANN
Commissioner of Patents and Trademarks